United States Patent [19]

Kindl et al.

[11] 3,753,149

[45] Aug. 14, 1973

[54] GAS LASER

[75] Inventors: Helmut Kindl, Munich; Heinz Westermeier, Neubiberg, both of Germany

[73] Assignee: Siemens Aktiengesellschaft, Berlin and Munich, Germany

[22] Filed: July 29, 1971

[21] Appl. No.: 167,295

[30] Foreign Application Priority Data
Aug. 11, 1970 Germany............... P 20 39 947.7

[52] U.S. Cl....................... 331/94.5 G, 331/94.5 D
[51] Int. Cl............................................... H01s 3/00
[58] Field of Search.................................... 331/94.5

[56] References Cited
UNITED STATES PATENTS
3,404,350  10/1968  Muncheryan............... 331/94.5
3,356,966  12/1967  Miller........................... 331/94.5
3,496,484  2/1970  Huffnagle..................... 331/94.5

Primary Examiner—Ronald L. Wibert
Assistant Examiner—Conrad Clark
Attorney—Carlton Hill, J. Arthur Gross et al.

[57] ABSTRACT

A gas laser having both a discharge tube with a capillary tube and an electronic arrangement, which serves as a power supply, sealed in a housing characterized by the housing being a metal tube having each end closed by an end wall to form a sealed chamber which contains the electronic arrangement which is a hollow cylinder that concentrically receives the capillary tube. Preferably, the chamber of the housing is filled with an electrically insulating and heat conducting material which is either a liquid or cast therein. The electronic arrangement preferably comprises the elements of the arrangement embedded in a cast plastic material which is cast in a hollow cylinder. One of the end walls of the housing contains the decoupling window and has a conical recess therearound for receiving a free end of the capillary tube which is sealed by an O-ring sealing ring and which is urged into engagement with the conical recess by a spring plate disposed in the housing.

10 Claims, 1 Drawing Figure

PATENTED AUG 14 1973 3,753,149
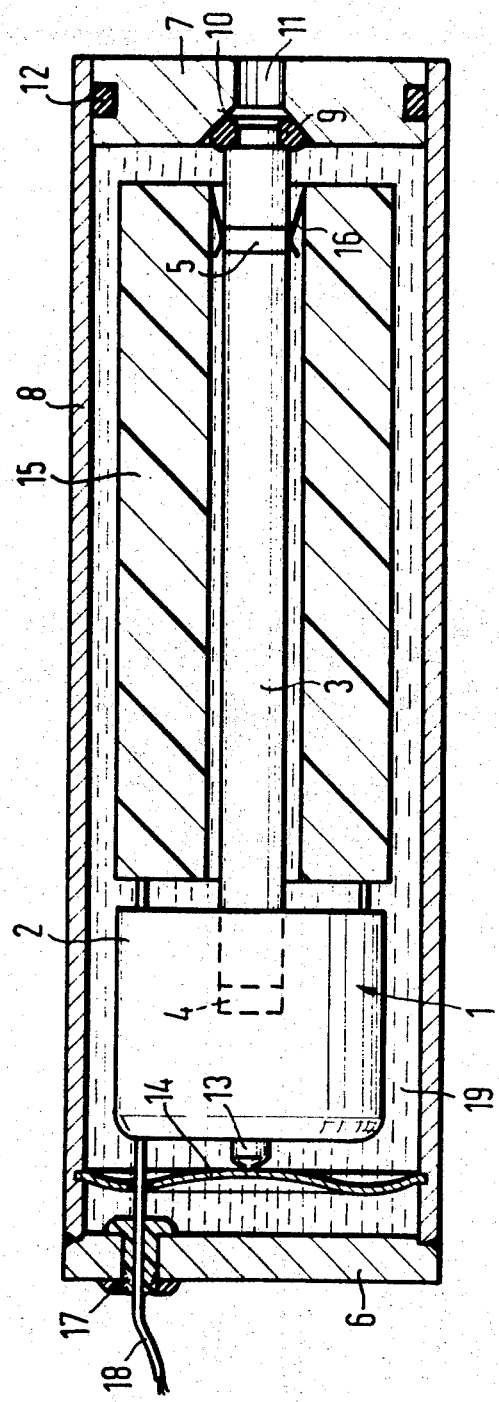
INVENTORS
*Helmut Kindl*
*Heinz Westermeier*
BY:
Hill, Sherman, Meroni, Gross & Simpson
ATTYS.

GAS LASER

BACKGROUND OF THE INVENTION

Field of the Invention

The present invention relates to a gas laser having a discharge tube which includes a capillary tube and electronic arrangements which are sealed in a housing.

SUMMARY OF THE INVENTION

The present invention provides an easy to handle, compact laser which has increased directional stability and symmetrical heat distribution. The laser has a housing formed of a metal tube which is sealed at each end by an end wall to form a sealed chamber which receives a discharge tube and an electronic arrangement, which is a power supply and which concentrically receives the capillary tube of the discharge tube. Preferably the sealed housing is filled with an electrically insulating and heat conducting material such as a liquid or solid and the electronic arrangement includes the electrical components or elements embedded in a plastic material formed to the shape of the hollow cylinder. One of the end walls of the housing is provided with a passageway with a seal for a current supply cable to the electronic arrangement and the other end wall is provided with a decoupling window having a conical recess therearound in which a free end of the capillary tube is mounted by a seal as the discharge tube arrangement is urged by a spring means against the recess.

BRIEF DESCRIPTION OF THE DRAWINGS

The principles of the present invention are particularly useful when incorporated in a gas laser having a discharge tube arrangement generally indicated at 1. The discharge tube 1 contains a cold-cathode discharge member 2 which sealing receives one end of a laser capillary tube 3 in an internal cavity. The capillary tube 3 has an axially extending bore which is in communication with the internal cavity of the member 2 which cavity is closed off by a fully mirrored plate 4 representing a mirror of a laser resonator. An anode 5 of the discharge tube is located on the capillary tube 3 adjacent the free end of the capillary tube.

The discharge tube 1 is arranged in a chamber of the housing formed by a metal tube 8 which is sealingly closed at each end by end walls 6 and 7. As illustrated, the end wall 6 is sealed to the metal tube 8 by a peripheral weld joint. To enable access to the chamber for inspection and during assembly, the other end wall 7 is removably sealed to the metal tube 8 by seal means illustrated as an O-ring seal 12 received in a peripheral groove of the end wall 7. The end wall 7 on an inner surface has a conical recess 10 which surrounds a decoupling window 11 provided therein.

The discharge tube arrangement 1 is axially disposed in the chamber of the housing formed by the metal tube 8 with the free end of the capillary tube 3 received by the conical recess 10 and mounted thereby with the bore of the capillary tube 3 being coaxial with the decoupling window 11. To aid in maintaining and sealing the free end of the capillary tube 3 with respect to the recess 10, seal means such as an O-ring seal 9 is provided.

To maintain the free end of the capillary tube 3 in an engagement with the seal ring 9 and recess 10, spring means such as a spring plate 14 are provided in the housing to urge the discharge tube arrangement 1 towards the end wall 7. The spring plate 14, which has its peripheral edge or a portion thereof received in a groove provided on the inner surface of the metal tube 8, acts on the discharge tube arrangement 1 by engagement with a stub or projection 13 provided on the cold cathode discharge member 2.

An electrical arrangement 15, which includes a circuit of electrical components or elements that are arranged to form a power supply and or embedded in a plastic material, has a shape of a hollow cylinder. The electronic arrangement 15 is positioned in the chamber formed by the metal tube 8 and the end walls 6 and 7 to be concentrically disposed about the capillary tube 3 and coaxial therewith. The electronic arrangement 15, as illustrated, includes a ring 16 of spring contacts provided on the inner surface of the cylinder 15 to maintain the concentric relationship between the cylinder and capillary tube 3. The spring contact 16 can also provide electrical contacts for the anode 5 or it may support individual contact wires.

To supply current to the electronic arrangement 15, which acts as a power supply, a cable 18 extends through the end wall 6 of the housing and is sealed therewith by sealing member 17 provided in the end wall.

To form the electronic arrangement 15, the electrical components are arranged between a pair of end plates and between concentric tubular molds. Then a plastic material is cast or molded about the electrical components or elements between the concentric tubular molds and the end walls to form the hollow cylinder of the arrangement.

The entire chamber of the housing formed by the metal tube 8 is preferably filled with an electrically insulating and heat conducting material such as a liquid 19, which may be an oil similar to those used in transformer assemblies. If desired the material may be a solid material which is cast or molded in the housing after assembly of the parts therein and prior to assembling the end wall 7 with the tube 8. The material 19 provides a better heat balance in the housing between the components to provide a symmetrical heat distribution during the operation of the gas laser.

Although minor modifications might be suggested by those versed in the art it should be understood that we wish to employ within the scope of the patent warranted hereon all such modifications that reasonably and properly come within the scope of our contribution to the art.

We claim as our invention:

1. In a gas laser having a discharge tube which includes a capillary tube and an electronic arrangement which includes a circuit of elements forming a power supply with said electronic arrangement and discharge tube being received in a sealed housing the improvement comprising said housing being a hollow metal tube having each end sealed by an end wall to form a sealed chamber and said electronic arrangement being a hollow cylinder for concentrically receiving the capillary tube of the discharge tube when positioned in said chamber.

2. In a gas laser according to claim 1, wherein the hollow cylinder of the electronic arrangement comprises the circuit of elements of the electronic arrangement embedded in a plastic material having the configuration of the hollow cylinder.

3. In a gas laser according to claim 1, wherein the entire sealed chamber of the housing is filled with an electrically insulating and heat conducting material.

4. In a gas laser according to claim 3, wherein said electrically insulating and heat conducting material is a liquid.

5. In a gas laser according to claim 3, wherein said electrically insulating and heat conducting material is a material cast into said chamber.

6. In a gas laser according to claim 1, wherein at least one of the end walls is removably sealed to the end of the metal tube to enable access to said sealed chamber.

7. In a gas laser according to claim 1, wherein one of the end walls has means for receiving a current supply cable for the electronic arrangement and the other end wall remote therefrom is provided with a decoupling window for the laser radiation.

8. In a gas laser according to claim 1, characterized wherein one of the end walls of the housing has a conical recess and wherein the capillary tube is mounted in the conical recess by a sealing ring.

9. In a gas laser according to claim 8, wherein spring means are disposed in the sealed chamber of the housing for biasing the capillary tube toward the conical recess.

10. In a gas laser according to claim 1, wherein one of the end walls has a decoupling window for the laser radiation, said one end wall having a conical recess on an inner surface around said window for receiving a free end of said capillary tube, and said housing including spring means remote from said one end wall for biasing the capillary tube to hold said free end in said recess.

* * * * *